United States Patent
Colby

[11] Patent Number: 5,952,053
[45] Date of Patent: Sep. 14, 1999

[54] PROCESS FOR PRODUCING FILLED POLYURETHANE ELASTOMERS

[75] Inventor: Scott A. Colby, Eugene, Oreg.

[73] Assignee: Willamette Valley Company, Eugene, Oreg.

[21] Appl. No.: 08/938,041

[22] Filed: Sep. 26, 1997

[51] Int. Cl.$^6$ .................. B05D 7/06; B05D 1/34
[52] U.S. Cl. .......... 427/393; 524/702; 524/729; 524/789; 524/791
[58] Field of Search ............... 524/702, 729, 524/789, 791; 427/393

[56] References Cited

U.S. PATENT DOCUMENTS

| | | | |
|---|---|---|---|
| 2,730,433 | 1/1956 | Cartledge | 23/285 |
| 3,012,977 | 12/1961 | Wilson et al. | 260/2.5 |
| 3,319,937 | 5/1967 | Wilson et al. | 259/8 |
| 3,377,297 | 4/1968 | Hanlin | 260/2.5 |
| 3,431,081 | 3/1969 | Edwards et al. | 23/285 |
| 3,927,162 | 12/1975 | Stalter, Sr. | 264/51 |
| 4,038,037 | 7/1977 | Wilmsen | 23/288 |
| 4,267,081 | 5/1981 | Seneker | 260/22 TN |
| 5,182,313 | 1/1993 | Carson | 521/155 |
| 5,378,733 | 1/1995 | Bates et al. | 521/54 |
| 5,476,638 | 12/1995 | Sulzbach | 422/133 |
| 5,578,655 | 11/1996 | Fiorentini | 521/155 |
| 5,587,448 | 12/1996 | Engen | 528/55 |
| 5,604,267 | 2/1997 | Duffy | 521/133 |

FOREIGN PATENT DOCUMENTS

| 5-170858 | 3/1993 | Japan . |
|---|---|---|

*Primary Examiner*—Erma Cameron
*Attorney, Agent, or Firm*—Marger Johnson & McCollom, P.C.

[57] ABSTRACT

This invention relates to a process for producing filled polyurethane elastomers, and more particularly to a process for producing highly filled polyurethane elastomers in which resin solid separation is substantially reduced. The separation rate of the solid particulate fillers contained in a filled polyol resin is significantly reduced, and the subject process can be optimized to lower the viscosity of the uncured liquid reaction mixture prior to curing same to form a solid, thereby substantially non-cellular filled polyurethane elastomer. The above-described benefits can be accomplished by reacting together a three-component polyurethane system comprising (a) a filled polyether polyol resin having a particulate filler material dispersed therein, (b) a polyisocyanate, and (c) a catalyst solution for reacting (a) and (b) to form said filled polyurethane elastomer.

28 Claims, No Drawings

PROCESS FOR PRODUCING FILLED POLYURETHANE ELASTOMERS

BACKGROUND OF THE INVENTION

This invention relates to a process for producing filled polyurethane elastomers, and more particularly to a process for producing highly filled polyurethane elastomers in which resin solid separation is substantially reduced.

Urethane polymers or polyurethanes are a large family of polymers with widely varying properties and uses. Urethane polymers are generally classified into two broad categories. The first is a polyurethane foam, and the second is a polyurethane elastomer. Polyurethane foams are polyurethane polymers produced by the reaction of polyisocyanates with a hydroxyl group from a polyol and a polymerization catalyst, in the presence of water and/or an auxiliary blowing agent. The blowing agent allows the polymeric mass to expand into a cellular mass upon reaction.

In preparing a non-cellular polyurethane elastomer, no blowing agent or mechanism for producing gas which would lead to cell development should be present. Therefore, in the later case, a non-cellular urethane polymer is produced by the reaction of the isocyanate with a hydroxyl group to form urethane linkages in the presences of a polymerization catalyst. Apparatuses for making polyurethane materials are known. Various apparatuses for metering polyurethane reactants and thereby forming the requisite polyurethane material are described in the following patents: U.S. Pat. No. 2,730,433; U.S. Pat. No. 3,012,977; U.S. Pat. No. 3,319,937; U.S. Pat. No. 3,377,297; U.S. Pat. No. 3,431,081; U.S. Pat. No. 3,927,162; U.S. Pat. No. 4,038,037; U.S. Pat. No. 5,182,313; U.S. Pat. No. 5,476,638; U.S. Pat. No. 5,578,655; and U.S. Pat. No. 5,604,267.

Non-cellular polyurethanes can be used, for example, in wood products applications, such as plywood patch applications, for filling void areas therein such as crevices, holes, and other product imperfections. Typically, these compositions are applied in an assembly line fashion, thereby requiring a rapid cure at room temperature (generally less than one minute). The uses contemplated herein for filling void areas in wood products include plywood substrates and railroad ties.

Conventional polyurethanes are made by reacting two-components, i.e., a polyol resin that already contains catalyst, and a polyisocyanate. A conventional two-component process mixes the catalyst component into the resin during its manufacture, prior to transportation and storage. When even a small amount of catalyst is added to the resin in the conventional two-component process, the viscosity of the polyol resin is substantially reduced.

When the uncured liquid reaction mixture is dispensed into plywood defects the presence of a lower viscosity polyurethane reduces the amount of overfill waste (i.e., polyurethane that has mounded above the height of the panel). The polyurethane overfill waste is then sanding off to create a smooth, defect free, plywood panel. It is estimated that polyurethane overfill waste represents half of the polyurethane used to repair plywood defects.

When filled polyol resin is manufactured in a centralized location, and transported hundreds of miles to plywood mills for the filling of plywood defects, filler separation problems occur since the separation rate of the particulate solids is significantly increased. In the wood products industry, polyol resin separation is a major detriment causing the polyurethane materials to excessively shrink or chip out.

SUMMARY OF THE INVENTION

The problems expressed above have been overcome by employing the process of the present invention. The separation rate of the solid particulate fillers contained in a filled polyol resin is significantly reduced, and the subject process can be optimized to lower the viscosity of the uncured liquid reaction mixture prior to curing same to form a solid, thereby substantially non-cellular filled polyurethane elastomer.

The above-described benefits can be accomplished by reacting together a three-component polyurethane system comprising (a) a filled polyether polyol resin having a particulate filler material dispersed therein, (b) a polyisocyanate, and (c) a catalyst solution for reacting (a) and (b) to form said filled polyurethane elastomer. This is unlike conventional polyurethanes which are formed by reacting two-components, i.e., a polyol resin that contains a predetermined amount of catalyst, and a polyisocyanate.

Reactant materials (a)–(c) are maintained in different locations from each other, including during transportation and storage of (a)–(c), prior to producing said filled polyurethane elastomer. In this way, the separation rate of said particulate filler material from said filled polyol material is substantially reduced. Then, the filled polyol material, organic polyisocyanate, and catalyst are reacted to form said filled polyurethane elastomer.

Several benefits are achieved by segregating the catalyst from the polyol resin during transportation and storage of the resin, and instead, by adding the catalyst just prior to forming a polyurethane solid. One benefit of using a three-component process is that the separation rate of solid particulate fillers contained in the polyol resin, typically a liquid polyether polyol resin, is significantly reduced when the catalyst remains as a separate liquid during transportation and storage. More specifically, the rate of separation of said particulate filler material from said filled polyol material is preferably not more than about 25%, more preferably not more than about 35%, and most preferably not more than about 50%, of the rate of separation of a conventional filled polyol material to which said catalyst has been added prior to producing said filled polyurethane elastomer.

In a conventional two-component process which mixes the catalyst into the resin during its manufacture, and prior to transportation and storage, the viscosity of the resin is drastically reduced, and hence the separation rate of particulate solids is increased. On the other hand, the three-component processes lower resin solid/liquid separation rate facilitates centralized manufacture of filled polyol resin that can be more easily transported to remote locations prior to use and/or stored for longer time periods. For example, the viscosity of the filled polyol material, measured with a #6 spindle at a temperature of 140 degrees F., is preferably at least about 150%, more preferably at least about 175%, and most preferably at least about 200%, of the viscosity of a conventional filled polyol material to which said catalyst has been added prior to producing said filled polyurethane elastomer.

Another benefit of the three-component process is that it can be optimized to lower viscosity of the uncured liquid reaction mixture prior to curing to a solid polyurethane elastomer. At the same time, the resin maintains similar resin solid/liquid separation rates of a comparable two-component system. Lower mix viscosity is accomplished by removing thickening agents from the resin that are no longer required to keep solids suspended in the liquid polyol. Lower viscosity benefits the processability of uncured liquid polyurethanes via faster flow and leveling into the mold. Lower viscosity also permits easier release of trapped gases either created from unwanted side reactions or trapped during mold filling. Lowering the viscosity via higher temperature results in additional unwanted side reactions that create trapped gases in the polyurethane.

The above-described advantages of a three-component polyurethane process are particularly beneficial in the repair of wood products void areas at manufacturing facilities located in remote locations. Thus, filled polyol resin can be manufactured in a centralized location and then transported hundreds of miles to wood products mills for the filling of the voids.

The three-component process also significantly lowers the rate solids separate from the polyol resin thereby improving product homogeneity. A reduction in polyol resin separation significantly lowers excessive shrinkage or chipping out of the polyurethane filler in the production of urethane-filled wood product material.

The three-component process also significantly reduces the amount of overfill waste. Hence the cost to repair the void areas is greatly reduced.

Thickeners present in a two-component system can be eliminated or substantially reduced, if desired, in the three-component process formula; although thickeners can be employed to produce a lower viscosity product as described above. These thickeners are typically expensive. Therefore, the cost to manufacture a three-component filled polyurethane resin can be less than the cost of a comparable two-component product. More specifically, the amount of thickener material employed in the three-component process formula of the present invention is preferably not more than about 25%, more preferably not more than about 35%, and most preferably not more than about 50%, of the amount of thickener material present in a conventional two-component system.

Suitable fillers used in forming the filled polyol resin include barium sulfate, calcium sulfate, calcium carbonate, silica, talc, and clay particles, such as aluminum silicates, mica, magnesium silicates, ceramic and glass micro-spheres, polyester, polyurethane, rubber crumb, wood flour and kaolin. The preferred filler materials is calcium carbonate. The concentration of filler present in filled polyol resin is typically from about 10 to 80 Wt. %, preferably from about 15 to 75 Wt. %, more preferably from about 20 to 70 Wt. %, and most preferably from about 25 to 60 Wt. %.

The present invention relates to a composition based on non-cellular filled polyurethane elastomers prepared by reacting a polyether or polyester polyol with a polyisocyanate. If the polyol is a polyether polyol, the preferred polyethers are polyethylene oxide, polypropylene oxide or a sucrose-based polyether. Preferably, the ratio of NCO groups to hydroxyl groups is at least about 1 to 1, preferably at least about 1.5 to 1, and most preferably at least about 1.75 to 1. The OH functionality of the non-cellular filled polyurethane elastomers is preferably between about 2 and 6, more preferably between about 2.5 and 5.5, and most preferably between about 3 and 5.

The polyol mixtures can have an average molecular weight ranges between 300 to 5000, preferably between 500 and 4000, more preferably between about 1000 and 3,000, and most preferably between about 1500 and 2,500. The polyol concentration can range between about 10 to 80 Wt. %, preferably from about 15 to 75 Wt. %, more preferably from about 20 to 70 Wt. %, and most preferably from about 25 to about 60 Wt. %, based on the total weight of polyurethane resin.

The polyurethane reaction can include a catalyst system to accelerate the reaction between the isocyanate and the hydroxyl groups of each polyol. The catalysts utilized in the catalyst system of this invention for accelerating the subject non-cellular polyurethane formation reactions can include tin, mercury, lead, bismuth, zinc and various amine compounds such as are described in U.S. Pat. No. 5,011,902, which is incorporated herein in its entirety by reference.

More specifically, the polyurethane reaction is conducted in the presence of a catalytic amount of a catalyst or co-catalyst system comprising an organo-metallic compound or compounds. The organo-metallic compound or compounds preferably have from about 2 to 20 carbon atoms in the molecule, and at least one organo-metallic moiety, The metallic portion of the organo-metallic compound is preferably selected from the group consisting of bismuth, zinc, zirconium, antimony, lithium, and combinations thereof.

Preferably a bismuth and/or zinc salt of a carboxylic acid is employed as the catalyst herein. The catalyst system in this invention is specific to all combinations of organic bismuth compounds and organic zinc compounds, of which the total concentration in the polyol resin is preferably from about 0.1 Wt. % to 5.0 Wt. %, more preferably from about 0.2 Wt. % to 4.0 Wt. %, and most preferably from about 0.3 Wt. % to 3 Wt. %. Each catalyst component in the co-catalyst system may be dissolved in a suitable solvent forming a catalyst solution prior to incorporation into the polyurethane elastomer formulation.

In certain instances it may be desirable to add a chain extender to complete the formulation of polyurethane polymers by reacting isocyanate groups of adducts or prepolymers. Examples of some types of polyol and amine chain extenders include 1,4-butanediol, diethylene glycol, trimethylol propane and hydroquinone di(beta hydroxyethyl ether). The subject polyurethane compositions may additionally incorporate diluents, compatibilizers, thixotropes, pigments and anti-settling agents. Suitable compatibilizers are hydroxy-containing organic compounds, preferably hydroxy-containing monocyclic compounds such as ethoxylated nonyl phenol, which compatibilize the polyol and aromatic diisocyanate reactants in the formulation.

Several plasticizers can be used in this invention to modify the final properties of the polyurethane elastomer. Typical plasticizers are paraffins, napthenic solvents, and phthalates. The plasticizers have a concentration which preferably can range between 1 Wt % to 25 Wt. %, more preferably from about 2 Wt. % to 20 Wt. %, and most preferably from about 3 Wt. % to 15 Wt. %.

Thickeners can also be added to filled polyol resins to help reduce solid/liquid separation. Typical thickeners include fumed silica, precipitated clay, precipitated calcium carbonate, cellulose, and glycol. The thickener concentration typically ranges between 0.1 Wt. % to 5.0 Wt. %, more preferably from about 0.2 Wt. % to 4.0 Wt. %, and most preferably from about 0.3 Wt. % to 3 Wt. %.

Other miscellaneous materials are used including molecular sieve to reduce water contaminants and silicone to reduce surface tension. Both typically represent less than 1 Wt. % of the polyol resin system.

The foregoing and other objects, features and advantages of the invention will become more readily apparent from the following detailed description of a preferred embodiment.

DETAILED DESCRIPTION OF A PREFERRED EMBODIMENT

A wood product resin formulation, for example, a plywood patch resin, can be produced by mixing the ingredients which form the requisite composition using a high shear mixing blade. The resin is typically mixed for several hours to thoroughly grind and disperse the calcium carbonate into the liquid polyol. A conventional two-component process also includes the catalyst, which readily mixes into the solution, during the mixing operation. However, the process of the present invention does not add the catalyst during the initial manufacturing of the resin. Rather the catalyst, isocyanate, and filled polyol resin are simultaneously mixed/dispensed via three-component metering equipment, that then reacted to produce a solid polyurethane elastomer.

One highly filled polyurethane elastomer used for the filling of void areas in wood products which has been found to be suitable in the method of the present invention is available from the Willamette Valley Company of Eugene, Oregon under the tradename U-100 Plywood Patch. Three-component dispensing/metering equipment for this filled polyurethane elastomer is commercially available. For instance, one can employ for use herein the Willamette Valley Company MixMaster in combination with the WVCO U-100 metering apparatus. In general, however, the process can be conducted using three storage tanks which contain, respectively, an isocyanate, a filled polyol, and a catalyst. Three pumps operate to pump the three-components from the storage tanks to a proportioning unit where the components are measured out according to a specified ratio, and then pumps separately into a mixing chamber or gun. Then, the components are mixed and ejected. Depending upon the system, solvent flush may be required to prevent as-mixed materials from forming in various cavities and channels within the dispensing head. This was the type of equipment system used to dispense the invention described herein. The three-component meter systems available on the market are used to allow in-line process control of polymeric cure profiles. The three-component metering apparatus allow changing the concentration of catalyst that is metered into the polymeric medium.

The entire system is temperature controlled using a combination of heaters attached to the hoses leading from the proportioning unit to the dispensing head. One preferred dispensing system, the U-100 Dispensing Gun manufactured by the Willamette Valley Company, uses a disposable mixing tube located at the end of the dispensing gun apparatus. The mixing tube mixes the components together into a homogeneous liquid that then reacts to form a cured solid polyurethane material.

EXAMPLE 1

The process of the present invention was compared experimentally with conventional two-component processing methods (i.e., catalyst and filled polyol resin are mixed together during manufacturing). In the first experiment, transportation and storage of filled resin was simulated in the laboratory. The ingredients of the Willamette Valley Company U-100 polyol resin are listed in Table 1 below.

TABLE 1

Two Component and Three Component Plywood Patch Resin Formulation

| INGREDIENT | U-100 POLYOL RESIN (Two Component Process) Weight Percent | U-100 POLYOL RESIN (Three Component Process) Weight Percent |
|---|---|---|
| Polyol/Paraffin | | |
| 1500 M.W. Polyether Triol | 6 | 6 |
| 600 M.W. Polyether Triol | 8 | 8 |
| 3000 M.W. Polyether Triol | 14 | 14 |
| 200 M.W. Normal Paraffin Filler | 7 | 7 |
| Calcium Carbonate | 63 | 63 |
| Catalyst | | |
| Bismuth Neodecanoate | 0.1 | 0* |
| Zinc Neodecanoate | 0.1 | 0* |
| Thickener | | |
| Fumed Silica | 0.6 | 0.6 |
| Misc. | | |
| Molecular Sieve | 0.6 | 0.6 |
| Silicone Surfactant | 0.03 | 0.03 |

*Add later via three component dispensing equipment

The U-100 polyol resin was poured into a 120 ml ALL-PAK, Inc. glass jar. The container was sealed and vibrated via Ray Foster, Inc. Dental Vibrator in 140 of oven for twenty-four hours. The amount of solids that settled to the bottom of the container was then measured. Polyol resin with and without catalyst was tested. Polyol resin that contained catalyst is indicative of resin used with conventional two-component metering/dispensing equipment. Polyol resin that did not contain catalyst is indicative of the present invention where the catalyst is added as a third component during metering/dispensing.

The test results shown in Table 2 clearly demonstrate that the settling of filler in the polyol resin is significantly slower using the three-component system described in this invention than conventional two-component resin systems.

TABLE 2

Settled Solids of a Two Component Polyol Resin vs. A Three Component Polyol Resin

| MEASUREMENT | U-100 POLYOL RESIN (Two Component Process) | U-100 POLYOL RESIN (Three Component Process) |
|---|---|---|
| Viscosity (cps) (#6 Brookfield spindle @ 80 F.) | 3,300 | 10,000 |
| Settled Solids (g) After 24 hr Shaker @ 140 F. | 40 | 4 |

EXAMPLE 2

The process of the present invention was tested together with conventional two-component processing methods. In this second test, U-100 polyol resin was dispensed into defects in plywood and the amount of overfill waste was measured (i.e., polyurethane that mounded above the face of the panel). Thickeners were removed from the three-component polyol resin to equal the viscosity and corresponding solids separation rate of conventional two-component U-100 polyol resin. The ingredients of the optimized U-100 resin are listed in Table 3, versus the comparable two-component Willamette Valley Company U-100 resin. Crude polymeric isocyanate (13 Wt. % of total mixture) was used to react with the polyol resin to create a solid elastomer.

TABLE 3

Two Component and Optimized Three Component Plywood Patch Resin Formulation

| INGREDIENT | U-100 POLYOL RESIN (Two Component Process) WEIGHT PERCENT | U-100 POLYOL RESIN (Three Component Process) WEIGHT PERCENT |
| --- | --- | --- |
| Polyol/Paraffin | | |
| 1500 M.W. Polyether Triol | 6 | 6 |
| 600 M.W. Polyether Triol | 8 | 8 |
| 3000 M.W. Polyether Triol | 14 | 14 |
| 200 M.W. Normal Paraffin Filler | 7 | 7 |
| Calcium Carbonate | 63 | 63 |
| Catalyst | | |
| Bismuth Neodecanoate | 0.1 | 0* |
| Zinc Neodecanoate | 0.1 | 0* |
| Thickener | | |
| Fumed Silica | 0.6 | 0.1** |
| Misc. | | |
| Molecular Sieve | 0.6 | 0.6 |
| Silicone Surfactant | 0.03 | 0.03 |

*Add later via three component dispensing equipment
**Thickener concentration reduced to match viscosity of comparable two component process formula.

It is estimated that polyurethane overfill waste represents half of the polyurethane used to repair plywood defects. The three-component process significantly reduces the amount of overfill waste and hence reduces the cost to repair plywood defects. Assuming a typical two inch round defect in a plywood face veneer, approximately 10% less polyurethane is required due to the lower overfill waste. Also, the thickeners removed to optimize the three-component process formula are typically expensive and therefore the cost to manufacture the optimized three-component resin is less than a comparable two-component process.

The height of the overfill that mounded above the plywood face was measured and is indicative of the amount of overfill waste. The test results listed in Table 4 clearly show that the height of overfill waste from incorporating a three-component system is significantly lower compared to the height of overfill waste generated from conventional two-component processing.

TABLE 4

Overfill Waste of a two Component Polyol Resin vs. a three Component Polyol Resin

| MEASUREMENT | U-100 POLYOL RESIN (Two Component Process) | U-100 POLYOL RESIN (Three Component Process) |
| --- | --- | --- |
| Viscosity (cps) (#6 Brookfield spindle @ 80 F.) | 3,300 | 3,300 |
| Settled Solids (g) After 24 hr Shaker @ 140 F. | 40 | 4 |
| Overfill Waste Height (inches) | *0.090 | 0.065 |

*Assumes a two inch round defect in plywood with a one eight inch to one forth inch perimeter overfill.

Finally, the two examples describing the invention herein, are intended to represent bounding cases between minimizing resin solid separation on one hand, and minimizing overfill waste on the other. Varying the concentration of thickener (i.e., fumed silica) in the polyol resin between the concentrations listed in examples one and two, produce compromises between resin solid separation performance versus minimizing overfill waster performance.

I claim:

1. A process for producing a filled, substantially non-cellular polyurethane elastomer, which comprises:
   providing a three component polyurethane system comprising; (a) a filled polyol material having a particulate filler material dispersed therein, (b) a polyisocyanate, and (c) a catalyst for reacting (a) and (b) to form said filled polyurethane elastomer;
   maintaining (a), (b) and (c) in different locations from each other, including during transportation and storage of (a), (b) and (c), prior to producing said filled polyurethane elastomer thereby substantially reducing the separation rate of said particulate filler material from said filled polyol material,
   said rate of separation of said particulate filler material from said filled polyol material in said three component polyurethane system being not more than about 25% of the rate of separation of a two component polyurethane system comprising a filled polyol material to which said catalyst has been added prior to producing said filled polyurethane elastomer and a polyisocyanate; and
   reacting (a) said filled polyol material, (b) said organic polyisocyanate, and (c) said catalyst, to form said filled polyurethane elastomer.

2. The process of claim 1 wherein said filled polyurethane elastomer comprises a polyol selected from the group consisting of polyether polyols and polyester polyols.

3. The process of claim 1 wherein said catalyst system comprises at least one organo metallic compound.

4. The process of claim 1 wherein said viscosity in said three component polyurethanes system of said filled polyol material, measured with a #6 spindle at a temperature of 140 degrees F., is at least about 150 % of the viscosity of a polyol material in said two component polyurethane system to which said catalyst has been added prior to producing said filled polyurethane elastomer.

5. The process of claim 1 wherein the said filled polyurethane elastomer includes a thickener.

6. The process of claim 1 wherein the concentration of said particulate filler material present in said filled polyol resin is from about 10 to 80 Wt. %.

7. The process of claim 1 wherein said particulate filler material in said filled polyol resin is selected from a group consisting of barium sulfate, calcium sulfate, calcium carbonate, silica, talc, clay particles, aluminum silicates, mica, magnesium silicates, ceramic and glass micro-spheres, polyester, polyurethane, rubber crumb, wood flour and kaolin.

8. The process of claim 1 wherein said polyisocyanate has a ratio of NCO groups to hydroxyl groups of at least about 1 to 1, and an OH functionality of between about 2 and 6.

9. The process of claim 1 wherein said catalyst comprises an organo-metallic compound having a metallic portion which is selected from the group consisting of bismuth, zinc, antimony, lithium and combinations thereof.

10. The process of claim 1 wherein the filled polyol material has an average molecular weight between about 300 to 5000.

11. A process for filling void and areas in a wood substrate, which comprises:

providing a wood substrate having said void areas therein;

providing a three component polyurethane system comprising; (a) a filled polyol material having a particulate filler material dispersed therein, (b) a polyisocyanate, and (c) a catalyst for reacting (a) and (b) to form a filled substantially non-cellular polyurethane elastomer;

maintaining (a), (b) and (c) in different locations from each other, including during transportation and storage of (a), (b) and (c), prior to producing said filled polyurethane elastomer thereby substantially reducing the separation rate of said particulate filler material from said filled polyol material, said rate of separation of said particulate filler material from said filled polyol material in said three component polyurethane system being not more than about 25% of the rate of separation of a two component polyurethane system comprising a conventional filled polyol material to which said catalyst has been added prior to producing said filled polyurethane elastomer and a polyisocyanate;

introducing said (a) filled polyol material, (b) said organic polyisocyanate, and (c) said catalyst into said void areas; and reacting said filled polyol material, said organic polyisocyanate, and said catalyst to form a filled material comprising a filled polyurethane elastomer.

12. The process of claim 11 wherein said filled polyurethane elastomer comprises a polyol selected from the group consisting of polyether polyols and polyester polyols.

13. The process of claim 11 wherein said catalyst system comprises at least one organo metallic compound.

14. The process of claim 11 wherein said viscosity in said three component polyurethane system of said filled polyol material, measured with a #6 spindle at a temperature of 140 degrees F., is at least about 150% of the viscosity of a polyol material in said two component polyurethane system to which said catalyst has been added prior to producing said filled polyurethane elastomer.

15. The process of claim 11 wherein the said filled polyurethane elastomer includes a thickener.

16. The process of claim 11 wherein the concentration of said particulate filler material present in said filled polyol resin is from about 10 to 80 Wt. %.

17. The process of claim 11 wherein said particulate filler material in said filled polyol resin is selected from a group consisting of barium sulfate, calcium sulfate, calcium carbonate, silica, talc, and clay particles, aluminum silicates, mica, magnesium silicates, ceramic glass micro-spheres, polyester, polyurethane, rubber crumb, wood flour and kaolin.

18. The process of claim 11 wherein said polyisocyanate has a ratio c f NCO groups to hydroxyl groups of at least about 1 to 1, and an OH functionality of between about 2 and 6.

19. The process of claim 11 wherein said catalyst comprises an organo-metallic compound having a metallic portion which is selected from the group consisting of bismuth, zinc, antimony, lithium and combinations thereof.

20. The process of claim 11 wherein the filled polyol material has an average molecular weight between about 300 to 5000.

21. A process for patching void and defective areas in a wood substrate, which comprises:

providing a wood substrate having said void areas therein;

providing providing a three component polyurethane system comprising (a) a filled polyol material having a particulate filler material dispersed therein, (b) an organic polyisocyanate, (c) a catalyst for reacting (a) and (b) to form a filled non-cellular polyurethane elastomer, and (d) a thickener;

maintaining (a), (b) and (c) in different locations from each other, including during transportation and storage of (a), (b) and (c), prior to producing said filled polyurethane elastomer thereby substantially reducing the separation rate of said particulate filler material from said filled polyol material;

introducing (a) said filled polyol material, (b) said organic polyisocyanate, (d) said thickener and (c) said catalyst into said void areas; and reacting (a) said filled polyol material, (b) said organic polyisocyanate, (d) said thickener and said (c) catalyst to produce a filled polyurethane elastomer having a viscosity and a settled solids comparable to a viscosity and a settled solids of a conventional filled polyurethane elastomer comprising said filled polyol material and said catalyst which have been previously combined with each other, said organic polyisocyanate, and said thickener;

the amount of said thickener in said three component polyurethane system being up to 25% of the amount of said thickener in said two component polyurethane system.

22. The process of claim 21 wherein said filled polyol material is selected from the group consisting of polyether polyols and polyester polyols.

23. The process of claim 22 wherein said polyol material is a polyether polyol which is combined with a paraffin material.

24. The process of claim 21 wherein said catalyst comprises at least one organo-metallic having compound a metallic portion selected from the group consisting of bismuth, zinc, antimony, lithium and combinations thereof.

25. The process of claim 24 wherein said catalyst is selected from a group consisting of bismuth neodecanoate and zinc neodecanoate.

26. The process of claim 21 wherein said filler material present in said filled polyol resin is from about 10 to 80 Wt %.

27. The process of claim 21 wherein the thickener comprises fumed silica.

28. The process of claim 21 wherein said particulate filler material is selected from a group consisting of barium sulfate, calcium sulfate, calcium carbonate, silica, talc, clay particles, aluminum silicates, mica, magnesium silicates, ceramic and glass micro-spheres, polyester, polyurethane, rubber crumb, wood flour and kaolin clay.

* * * * *